United States Patent
Yang et al.

(10) Patent No.: US 12,012,518 B2
(45) Date of Patent: *Jun. 18, 2024

(54) POLYESTER FILM FOR LASER EMBOSSING AND METHOD FOR MANUFACTURING THE SAME

(71) Applicant: NAN YA PLASTICS CORPORATION, Taipei (TW)

(72) Inventors: Wen-Cheng Yang, Taipei (TW); Te-Chao Liao, Taipei (TW); Chia-Yen Hsiao, Taipei (TW); Wen-Jui Cheng, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 314 days.

This patent is subject to a terminal disclaimer.

(21) Appl. No.: 17/203,754

(22) Filed: Mar. 17, 2021

(65) Prior Publication Data

US 2022/0017770 A1 Jan. 20, 2022

(30) Foreign Application Priority Data

Jul. 15, 2020 (TW) .................. 109123859

(51) Int. Cl.
| | | |
|---|---|---|
| C09D 167/02 | (2006.01) | |
| B29B 17/04 | (2006.01) | |
| B29C 48/00 | (2019.01) | |
| B29C 48/08 | (2019.01) | |
| B29C 48/21 | (2019.01) | |
| B29C 48/22 | (2019.01) | |
| B29K 67/00 | (2006.01) | |
| B29K 105/26 | (2006.01) | |
| B32B 7/02 | (2019.01) | |
| B32B 7/027 | (2019.01) | |
| B32B 27/08 | (2006.01) | |
| B32B 27/16 | (2006.01) | |
| B32B 27/18 | (2006.01) | |
| B32B 27/36 | (2006.01) | |
| C08G 63/183 | (2006.01) | |
| C08J 11/06 | (2006.01) | |

(Continued)

(52) U.S. Cl.
CPC .............. *C09D 167/02* (2013.01); *B32B 7/02* (2013.01); *B32B 7/027* (2019.01); *B32B 27/08* (2013.01); *B32B 27/16* (2013.01); *B32B 27/18* (2013.01); *B32B 27/36* (2013.01); *C08G 63/183* (2013.01); *C08J 11/06* (2013.01); *C08J 11/22* (2013.01); *C08J 11/24* (2013.01); *B29B 17/04* (2013.01); *B29C 48/022* (2019.02); *B29C 48/08* (2019.02); *B29C 48/21* (2019.02); *B29C 48/22* (2019.02); *B29K 2067/003* (2013.01); *B29K 2105/26* (2013.01); *B32B 2250/02* (2013.01); *B32B 2250/03* (2013.01); *B32B 2250/04* (2013.01); *B32B 2250/244* (2013.01); *B32B 2250/40* (2013.01); *B32B 2264/06* (2013.01); *B32B 2270/00* (2013.01); *B32B 2272/00* (2013.01); *B32B 2307/30* (2013.01); *B32B 2307/718* (2013.01); *B32B 2307/732* (2013.01); *B32B 2439/60* (2013.01); *C08J 2367/02* (2013.01); *C08J 2467/02* (2013.01); *Y02W 30/62* (2015.05)

(58) Field of Classification Search
CPC .......... B32B 7/02; B32B 7/027; B32B 27/08; B32B 27/16; B32B 27/18; B32B 27/36; B32B 2250/02; B32B 2250/03; B32B 2250/04; B32B 2250/244; B32B 2250/40; B32B 2264/06; B32B 2270/00; B32B 2272/00; B32B 2307/30; B32B 2307/718; B29B 17/04; B29C 48/022; B29C 48/08; B29C 48/21; B29C 48/22; B29K 2067/003; B29K 2105/26; C08G 63/183; C08J 11/06; C08J 11/24; C08J 11/22; C08J 2367/02; C08J 2467/02; C09D 167/02; Y02W 30/62

See application file for complete search history.

(56) References Cited

U.S. PATENT DOCUMENTS

| | | | |
|---|---|---|---|
| 7,229,581 | B2 | 6/2007 | Kern et al. |
| 2004/0130059 | A1 | 7/2004 | Kern et al. |
| 2005/0014011 | A1 | 1/2005 | Oya |
| 2009/0082496 | A1 | 3/2009 | Tammaji et al. |

FOREIGN PATENT DOCUMENTS

| | | | |
|---|---|---|---|
| EP | 0651015 | * | 5/1995 |
| JP | 10193488 A | | 7/1998 |

(Continued)

OTHER PUBLICATIONS

Machine English translation of JP 2011-256328 Nakamachi, Dec. 2011.*

(Continued)

*Primary Examiner* — Patrick D Niland (74) *Attorney, Agent, or Firm* — Li & Cai Intellectual Property Office (57) ABSTRACT

A polyester film for laser embossing and a method for manufacturing the same are provided. The polyester film for laser embossing is made from a recycled polyester material, and includes a base layer and a skin layer. The skin layer is disposed on at least one surface of the base layer. The skin layer is formed from a first polyester composition. The first polyester composition includes regenerated polyethylene terephthalate as a main component and at least one component selected from 1,4-butanediol, isophthalic acid, neopentyl glycol, 2-methyl-1,3-propanediol, pentanediol, isopentyldiol, adipic acid, and 1,4-cyclohexanedimethanol, so that a melting point of the skin layer ranges from 190° C. to 240° C.

17 Claims, 3 Drawing Sheets

(51) Int. Cl.
  *C08J 11/22*  (2006.01)
  *C08J 11/24*  (2006.01)

(56) References Cited

FOREIGN PATENT DOCUMENTS

| | | |
|---|---|---|
| JP | 2003320632 A | 11/2003 |
| JP | 2004156041 A | 6/2004 |
| JP | 2008110515 A | 5/2008 |
| JP | 2011256328 A | 12/2011 |
| JP | 201296410 A | 5/2012 |
| JP | 2013202940 A | 10/2013 |
| KR | 1020100008011 A | 1/2010 |
| WO | WO2004058495 A1 | 7/2004 |

OTHER PUBLICATIONS

Machine English translation of JP 2012-096410, Takahashi et al., May 2012.*

* cited by examiner

POLYESTER FILM FOR LASER EMBOSSING AND METHOD FOR MANUFACTURING THE SAME

CROSS-REFERENCE TO RELATED PATENT APPLICATION

This application claims the benefit of priority to Taiwan Patent Application No. 109123859, filed on Jul. 15, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a polyester film for laser embossing and a method for manufacturing the same, and more particularly to a polyester film for laser embossing that is made from a recycled polyester material and a method for manufacturing the same.

BACKGROUND OF THE DISCLOSURE

In recent years, usage of plastics has increased significantly, and as a result, a large amount of plastic waste is produced. Since the plastics are not easily degraded, recycling of the plastics and how to process the plastics after recycling have become particularly important issues.

Polyethylene terephthalate (PET) makes up a major portion of recycled plastics, and recycled PET plastics takes up about 52.4% of a total amount of the recycled plastics. In order to deal with such a large amount of recycled PET plastics, researchers in the relevant field have to dedicate themselves to developing a method for processing the recycled PET plastics.

Out of the current techniques, the most common method to regenerate PET is through a physical (mechanical) manner. The recycled PET plastics that have been washed clean are firstly shredded to pieces and melted under high temperature, and then are extruded by an extruder to produce regenerated PET chips (also called as r-PET).

To address environmental concerns and to ensure that PET products contain more eco-friendly regenerated PET chips, a large amount of high-quality regenerated PET chips is required. In the current industry, the PET recycling is mostly carried out by way of physical recycling. However, functional components (such as a slipping agent and an electrostatic pinning agent) are not allowed to be added, during a manufacturing process, to recycled chips that are produced through physical recycling. Therefore, it is necessary to use additional virgin (not regenerated) PET chips for additionally adding the above-mentioned functional components.

However, after adding the virgin PET chips, a usage rate of the regenerated PET chips contained in the PET products will decrease. That is to say, in the current techniques, it is not possible to fully utilize the regenerated PET chips to manufacture new PET products. If the usage rate of the regenerated PET chips is too low, it may not be possible to satisfy a standard set up by environmental regulations such that an eco-label can be obtained. Moreover, as virgin PET chips that are newly used in the process of manufacturing the PET products would subsequently become the recycled PET plastics that require processing, a problem of recycling and reusing would still arise.

SUMMARY OF THE DISCLOSURE

In response to the above-referenced technical inadequacies, the present disclosure provides a polyester film for laser embossing and a method for manufacturing the same.

In one aspect, the present disclosure provides a polyester film for laser embossing. The polyester film for laser embossing is made from a recycled polyester material, and includes a base layer and a skin layer. The skin layer is disposed on at least one surface of the base layer. The skin layer is formed from a first polyester composition, and the first polyester composition includes regenerated polyethylene terephthalate as a main component and at least one component selected from 1,4-butanediol, isophthalic acid, neopentyl glycol, 2-methyl-1,3-propanediol, pentanediol, isopentyldiol, adipic acid, and 1,4-cyclohexanedimethanol, so that a melting point of the skin layer ranges from 190° C. to 240° C.

In some embodiments, the first polyester composition includes a physically regenerated polyester resin and a chemically regenerated polyester resin. A main component of each of the physically regenerated polyester resin and the chemically regenerated polyester resin is regenerated polyethylene terephthalate. Based on a total weight of the first polyester composition being 100 wt %, a content of the physically regenerated polyester resin ranges from 50 wt % to 95 wt %, a content of the chemically regenerated polyester resin ranges from 1 wt % to 40 wt %, and a total content of the physically regenerated polyester resin and the chemically regenerated polyester resin ranges from 50 wt % to 100 wt %.

In some embodiments, the chemically regenerated polyester resin is formed from chemically regenerated polyester chips. The chemically regenerated polyester chips include chemically regenerated regular polyester chips, chemically regenerated electrostatic pinning polyester chips, and chemically regenerated modified polyester chips. The chemically regenerated modified polyester chips include regenerated polyethylene terephthalate as a main component, and include residue of at least one of 1,4-butanediol, isophthalic acid, neopentyl glycol, 2-methyl-1,3-propanediol, pentanediol, isopentyldiol, adipic acid, and 1,4-cyclohexanedimethanol.

In some embodiments, based on a total weight of the chemically regenerated modified polyester chips being 100 wt %, the chemically regenerated modified polyester chips include at least one of following residues: 0 to 60 wt % of 1,4-butanediol residue; 0 to 20 wt % of isophthalic acid residue; 0 to 20 wt % of neopentyl glycol residue; 0 to 60 wt % of 2-methyl-1,3-propanediol residue; 0 to 20 wt % of pentanediol residue; 0 to 20 wt % of isopentyldiol residue; 0 to 20 wt % of adipic acid residue; and 0 to 20 wt % of 1,4-cyclohexanedimethanol residue.

In some embodiments, a concentration of cyclic oligomer in the physically regenerated polyester resin is lower than a concentration of cyclic oligomer in the chemically regenerated polyester resin.

In some embodiments, the skin layer contains 0.0003 wt % to 2 wt % of a nucleating agent.

In some embodiments, a thickness of the skin layer is 5% to 40% of a total thickness of the polyester film for laser embossing, and the total thickness of the polyester film for laser embossing ranges from 8 micrometers to 350 micrometers.

In some embodiments, based on the total weight of the first polyester composition being 100 wt %, the first polyester composition contains 0.5 wt % to 5 wt % of isophthalic acid.

In some embodiments, based on the total weight of the first polyester composition being 100 wt %, the first polyester composition contains 1 wt % to 25 wt % of a biomass-derived material, and a content of $C^{14}$ among total carbon atoms in the first polyester composition ranges from 0.2 wt % to 5 wt %.

In some embodiments, based on the total weight of the first polyester composition being 100 wt %, the first polyester composition contains 0.0003 wt % to 0.04 wt % of a metal catalyst, and the metal catalyst is selected from the group consisting of antimony, germanium, titanium, or any combination thereof.

In some embodiments, the base layer is formed from a second polyester composition. The second polyester composition includes regenerated polyethylene terephthalate as a main component, and includes a physically regenerated polyester resin and a chemically regenerated polyester resin. A main component of each of the physically regenerated polyester resin and the chemically regenerated polyester resin is regenerated polyethylene terephthalate. Based on a total weight of the second polyester composition being 100 wt %, a content of the physically regenerated polyester resin ranges from 50 wt % to 95 wt %, a content of the chemically regenerated polyester resin ranges from 1 wt % to 40 wt %, and a total content of the physically regenerated polyester resin and the chemically regenerated polyester resin ranges from 50 wt % to 100 wt %.

In another aspect, the present disclosure provides a method for manufacturing a polyester film for laser embossing. The method includes the following steps. A recycled polyester material is provided. A part of the recycled polyester material is physically reproduced to obtain physically regenerated polyester chips. The physically regenerated polyester chips include physically regenerated regular polyester chips. Another part of the recycled polyester material is chemically reproduced to obtain chemically regenerated polyester chips. The chemically regenerated polyester chips include chemically regenerated regular polyester chips and chemically regenerated electrostatic pinning polyester chips. Modified polyester chips are mixed with the physically regenerated polyester chips and the chemically regenerated polyester chips to form a raw material mixture, in which the modified polyester chips are formed through reproducing the recycled polyester material. The modified polyester chips include regenerated polyethylene terephthalate as a main component and at least one component selected from 1,4-butanediol, isophthalic acid, neopentyl glycol, 2-methyl-1,3-propanediol, pentanediol, isopentyldiol, adipic acid, and 1,4-cyclohexanedimethanol A skin layer is formed from the raw material mixture, and a melting point of the skin layer ranges from 190° C. to 240° C. A base layer is formed on the skin layer to obtain one polyester film for laser embossing.

In some embodiments, the modified polyester chips are chemically regenerated modified polyester chips, and the chemically regenerated modified polyester chips are prepared by the following steps. The recycled polyester material is depolymerized to obtain a first oligomer mixture. At least one of 1,4-butanediol, isophthalic acid, neopentyl glycol, 2-methyl-1,3-propanediol, pentanediol, isopentyldiol, adipic acid, and 1,4-cyclohexanedimethanol is added into the first oligomer mixture to form a second oligomer mixture. The second oligomer mixture is repolymerized to obtain the chemically regenerated modified polyester chips. The chemically regenerated modified polyester chips include regenerated polyethylene terephthalate as a main component, and include residue of at least one of 1,4-butanediol, isophthalic acid, neopentyl glycol, 2-methyl-1,3-propanediol, pentanediol, isopentyldiol, adipic acid, and 1,4-cyclohexanedimethanol.

In yet another aspect, the present disclosure provides a method for manufacturing a polyester film for laser embossing. The method includes the following steps. A recycled polyester material is provided. A part of the recycled polyester material is physically reproduced to obtain physically regenerated polyester chips. The physically regenerated polyester chips include physically regenerated regular polyester chips. Another part of the recycled polyester material is chemically reproduced to obtain chemically regenerated polyester chips. The chemically regenerated polyester chips include chemically regenerated regular polyester chips and chemically regenerated electrostatic pinning polyester chips. Modified polyester chips are mixed with the physically regenerated polyester chips and the chemically regenerated polyester chips, so as to form a raw material mixture, in which the modified polyester chips are formed through chemically reproducing the recycled polyester material. The modified polyester chips include regenerated polyethylene terephthalate as a main component, and include residue of at least one of 1,4-butanediol, isophthalic acid, neopentyl glycol, 2-methyl-1,3-propanediol, pentanediol, isopentyldiol, adipic acid, and 1,4-cyclohexanedimethanol. The physically regenerated polyester chips and the chemically regenerated polyester chips are mixed to form a base material. The raw material mixture and the base material are co-extruded to obtain one polyester film for laser embossing. The polyester film for laser embossing includes a skin layer formed from the raw material mixture and a base layer formed from the base material. A melting point of the skin layer ranges from 190° C. to 240° C.

One of the beneficial effects of the present disclosure is that, in the polyester film for laser embossing and the method for manufacturing the same as provided, by virtue of "the first polyester composition including regenerated polyethylene terephthalate as a main component and at least one component selected from 1,4-butanediol, isophthalic acid, neopentyl glycol, 2-methyl-1,3-propanediol, pentanediol, isopentyldiol, adipic acid, and 1,4-cyclohexanedimethanol", an amount of the recycled polyester material in the polyester film for laser embossing can be increased.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 1:
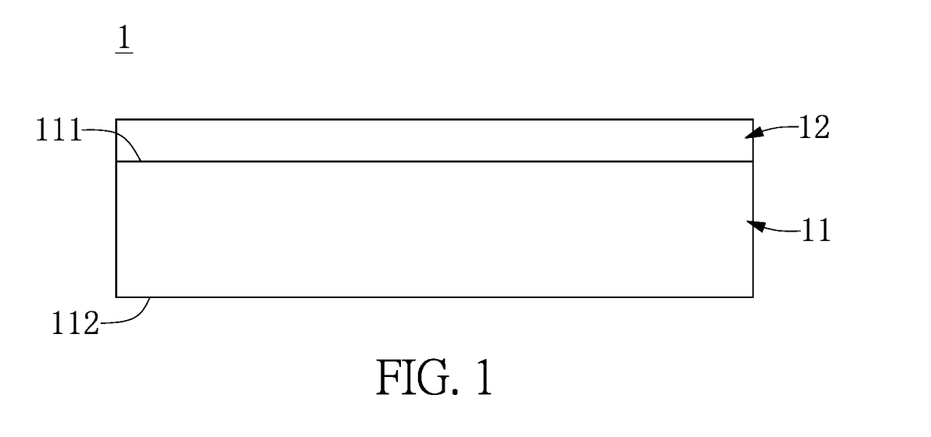
FIG. 1 is a side schematic view of a polyester film for laser embossing according to a first embodiment of the present disclosure.

Referring to FIG. 1, a first embodiment of the present disclosure provides a polyester film for laser embossing 1. The polyester film for laser embossing 1 includes a base layer 11 and a skin layer 12.

The base layer 11 is flexible, and has a first surface 111 and a second surface 112 that are opposite to each other. The skin layer 12 is disposed on the first surface 111 of the base layer 11, and is an easy-to-press embossed pattern layer. Further, the second surface 112 of the based layer 11 can optionally undergo a corona treatment.

In the present embodiment, a total thickness of the polyester film for laser embossing 1 ranges from 8 micrometers to 350 micrometers, and a thickness of the skin layer 12 is 5% to 40% of the total thickness of the polyester film for laser embossing 1.

Figure 2:
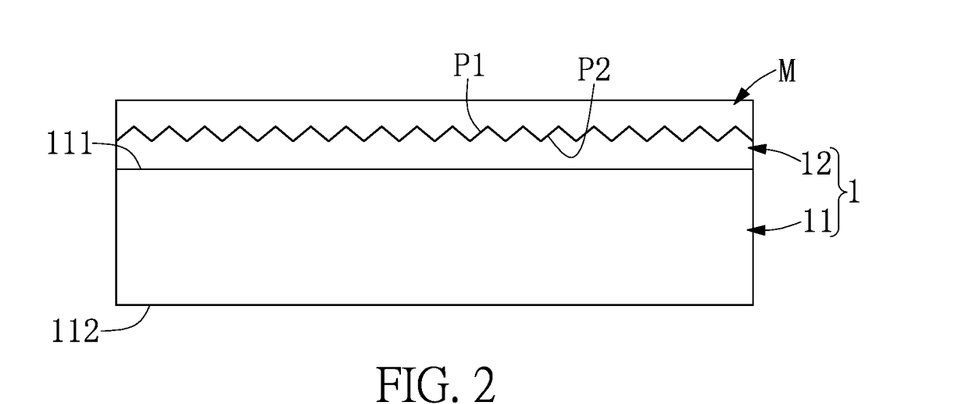
FIG. 2 is a schematic view showing the polyester film for laser embossing in use according to the first embodiment of the present disclosure.

Reference is made to FIG. 2. During use, a three-dimensional embossed pattern P1 can be formed on a metal stamper M by laser engraving. Subsequently, the metal stamper M can be used to press against the skin layer 12 of the polyester film for laser embossing 1. If necessary, the metal stamper M can be heated to a predetermined temperature (e.g., 200° C.), so that the skin layer 12 would have another three-dimensional embossed pattern P2 that is inverse to the three-dimensional embossed pattern P1 in unevenness. However, these details are provided for exemplary purposes only, and are not intended to limit the scope of the present disclosure.

The base layer 11 is formed from a polyester composition having a main component of regenerated polyethylene terephthalate. The polyester composition includes a physically regenerated polyester resin and a chemically regenerated polyester resin. A main component of each of the physically regenerated polyester resin and the chemically regenerated polyester resin is regenerated polyethylene terephthalate.

As for the polyester composition forming the base layer 11, based on a total weight of the polyester composition being 100 wt %, a content of the physically regenerated polyester resin ranges from 50 wt % to 95 wt %, a content of the chemically regenerated polyester resin ranges from 1 wt % to 40 wt %, and a total content of the physically regenerated polyester resin and the chemically regenerated polyester resin ranges from 50 wt % to 100 wt %. The skin layer 12 is formed from a polyester composition having a main component of regenerated polyethylene terephthalate. The polyester composition includes a physically regenerated polyester resin and a chemically regenerated polyester resin. A main component of each of the physically regenerated polyester resin and the chemically regenerated polyester resin is regenerated polyethylene terephthalate.

As for the polyester composition forming the skin layer 12, based on a total weight of the polyester composition being 100 wt %, a content of the physically regenerated polyester resin ranges from 50 wt % to 95 wt %, a content of the chemically regenerated polyester resin ranges from 1 wt % to 40 wt %, and a total content of the physically regenerated polyester resin and the chemically regenerated polyester resin ranges from 50 wt % to 100 wt %. A glass transition temperature (Tg) of the polyester composition forming the skin layer 12 ranges from 45° C. to 60° C., and a melting point (Tm) ranges from 190° C. to 240° C.

The polyester composition forming the skin layer 12 includes a modified agent. The modified agent includes at least one of 1,4-butanediol, isophthalic acid, neopentyl glycol, 2-methyl-1,3-propanediol, pentanediol, isopentyldiol, adipic acid and 1,4-cyclohexanedimethanol. The addition of the modified agent can lower the melting point of the polyester composition. In this way, the skin layer 12 has excellent processability, and is suitable for being used in an embossing process.

To further improve heat resistance and processability of the skin layer 12, the skin layer 12 contains 0.0003 wt % to 2 wt % of a nucleating agent. The nucleating agent can be a mineral material, a metallic oxide, a silicon compound, metal salts of organic acid or inorganic acid, metal salts of aromatic phosphate esters, polyol derivatives, a sulfimide compound, a glass powder, a metal powder, or any combination thereof. The nucleating agent can increase overall crystallinity, so that heat resistance of the skin layer 12 is improved. Further, the nucleating agent helps crystal growth, reduces crystal size, decreases formation of large spherulites, and prevents embrittlement of the film surface.

Specific examples of the mineral material include graphite, talc, and kaolinite. Specific examples of the metallic oxide include zinc oxide, aluminum oxide, and magnesium oxide. Specific examples of the silicon compound include silicon oxide, calcium silicate, and magnesium silicate. Specific examples of the metal salts of organic acid or inorganic acid include magnesium carbonate, calcium carbonate, sodium carbonate, potassium carbonate, barium sulfate, calcium sulfate, sodium benzoate, and aluminium p-tert-butylbenzoate. Examples of metal salts of phosphate esters include metal salts of aromatic phosphate esters. Examples of the polyol derivatives include dibenzylidene sorbitol. In consideration of heat resistance, the nucleating agent is preferably an inorganic material.

As mentioned above, the base layer 11 and the skin layer 12 are each formed from one polyester composition, and each polyester composition includes a physically regenerated polyester resin and a chemically regenerated polyester resin. It should be noted that the polyester composition forming the base layer 11 and the polyester composition forming the skin layer 12 can be the same or different.

By using both of the physically regenerated polyester resin and the chemically regenerated polyester resin in the present disclosure, a proportion of the recycled polyester material used in the base layer 11 and the skin layer 12 can be significantly increased. In addition, even without adding virgin polyester chips, there would not be many impurities, a problem that arises with use of only the physically regenerated polyester resin in the past.

Further, the aforementioned physically regenerated polyester resin is formed from one or many kinds of physically regenerated polyester chips. A main component of the physically regenerated polyester chips is regenerated polyethylene terephthalate. The aforementioned chemically regenerated polyester resin is formed from one or many kinds of chemically regenerated polyester chips. A main component of the chemically regenerated polyester chips is regenerated polyethylene terephthalate. The specific preparations of the physically regenerated polyester chips and the chemically regenerated polyester chips are illustrated later.

Figure 5:
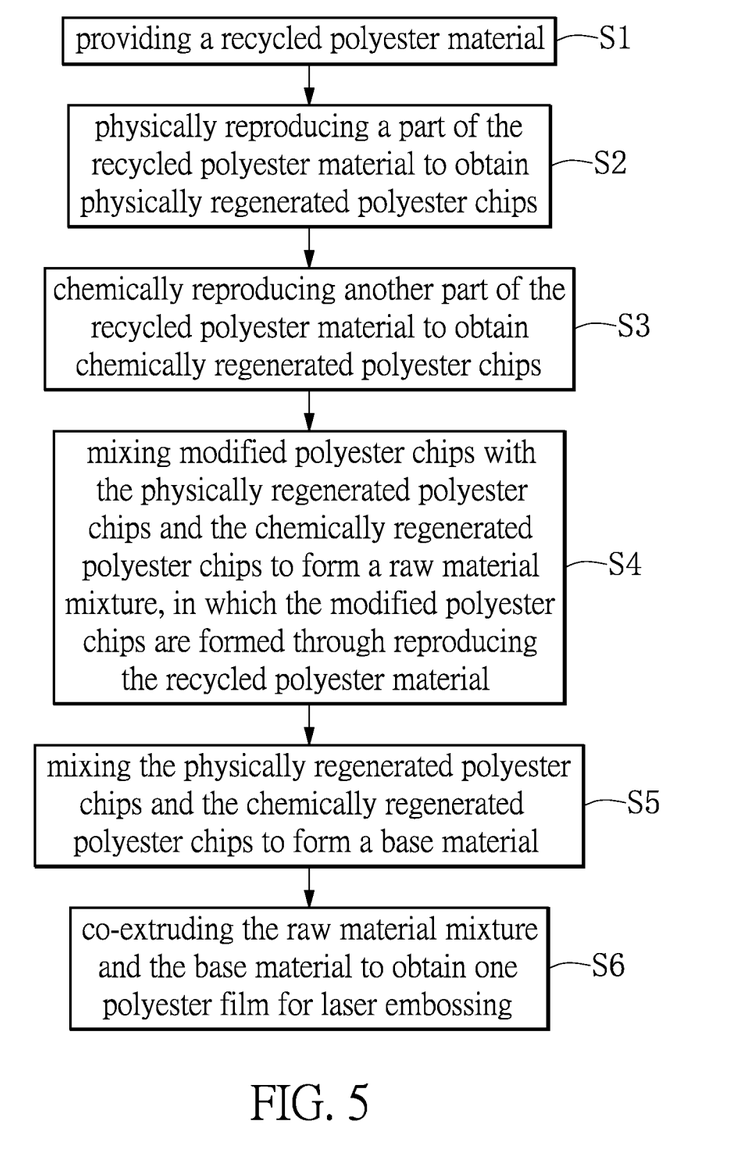
FIG. 5 is a flowchart describing steps of a method for manufacturing a polyester film for laser embossing according to the present disclosure.

Referring to FIG. 5, a method for manufacturing the polyester film for laser embossing includes the following steps. A recycled polyester material is provided (step S1). A part of the recycled polyester material is physically reproduced to obtain physically regenerated polyester chips having a main component of regenerated polyethylene terephthalate (step S2). Another part of the recycled polyester material is chemically reproduced to obtain chemically regenerated polyester chips having a main component of regenerated polyethylene terephthalate (step S3). Modified polyester chips are mixed with the physically regenerated polyester chips and the chemically regenerated polyester chips to form a raw material mixture, in which the modified polyester chips are formed through reproducing the recycled polyester material. The modified polyester chips include regenerated polyethylene terephthalate as a main component, and include residue of at least one of 1,4-butanediol, isophthalic acid, neopentyl glycol, 2-methyl-1,3-propanediol, pentanediol, isopentyldiol, adipic acid, and 1,4-cyclohexanedimethanol (step S4). The physically regenerated polyester chips and the chemically regenerated polyester chips are mixed to form a base material (step S5). The raw material mixture and the base material are co-extruded to obtain one polyester film for laser embossing (step S6).

In step S1, a source of the recycled polyester material is recycled PET bottle chips, and a main material of the PET bottle chips is polyester. Generally, the polyester is formed by polycondensation of diol units and diacid units. In the recycled PET bottle chips, the diol units can be ethylene glycol derived from petrochemical sources or ethylene glycol derived from biomass. Therefore, with respect to the polyester compositions forming the base layer 11 and the skin layer 12, based on the total weight of the polyester composition being 100 wt %, the polyester composition contains 1 wt % to 25 wt % of a biomass-derived material. Furthermore, a content of $C^{14}$ among total carbon atoms in the polyester composition ranges from 0.2 wt % to 5 wt %.

The recycled polyester material can include isophthalic acid. Therefore, the polyester compositions forming the base layer 11 and the skin layer 12 may also contain the isophthalic acid. Based on the total weight of the polyester composition being 100 wt %, the polyester composition contains 0.5 wt % to 5 wt % of the isophthalic acid.

The recycled polyester material can include a metal catalyst. Therefore, the polyester compositions forming the base layer 11 and the skin layer 12 may also contain the metal catalyst. Based on a total weight of a first polyester composition being 100 wt %, the first polyester composition contains 0.0003 wt % to 0.04 wt % of the metal catalyst. The metal catalyst is selected from the group consisting of antimony, germanium, titanium, and any combination thereof.

In step S2, a physical reproduction process includes steps as following. The recycled polyester material (such as bottle chips) is cut into pieces, and then melted to form a melted mixture. The melted mixture is extruded by a single-screw extruder or a twin-screw extruder, and then granulated to obtain the physically regenerated polyester chips.

In the present embodiment, the physically regenerated polyester chips include physically regenerated regular polyester chips. The term "physically regenerated regular polyester chips" in the present description refers to polyester chips prepared through the physical reproduction process, and no functional additive is added during the physical reproduction process. In the present embodiment, a main component forming the physically regenerated regular polyester chips is regenerated polyethylene terephthalate.

In addition, in the physical reproduction process, functional additives (such as slipping agent, coloring agent and matting agent) can also be added into the melted mixture, so that physically regenerated slipping polyester chips, physically regenerated color polyester chips or physically regenerated matting polyester chips can be obtained, respectively. It should be noted that the physically regenerated slipping polyester chips, the physically regenerated color polyester chips, and the physically regenerated matting polyester chips each include regenerated polyethylene terephthalate as a main component.

In step S3, a chemical reproduction process includes steps as following. The recycled polyester material (such as bottle chips) is cut into pieces, and then put in a chemical depolymerization solution, so that molecules of polyester are broken into polyester monomer having a shorter molecular chain (e.g. diol unit and diacid unit) and oligomers (e.g., cyclic oligomer), such that an oligomer mixture is formed. Subsequently, the oligomer mixture is isolated, purified, repolymerized, and then granulated to obtain the chemically regenerated polyester chips. In the present embodiment, a main component forming chemically regenerated regular polyester chips is regenerated polyethylene terephthalate.

In the present embodiment, the chemical depolymerization solution can be a solution of, for example, water, methanol, ethanol, ethylene glycol, diethylene glycol, or any combination thereof, but the present embodiment is not limited thereto. In practice, water can cause hydrolysis reaction on polyester, while methanol, ethanol, ethylene glycol, and diethylene glycol can cause alcoholysis reaction on polyester. In a preferable embodiment, the chemical depolymerization solution contains ethylene glycol.

In the present embodiment, the chemically regenerated polyester chips include the chemically regenerated regular polyester chips and chemically regenerated electrostatic pinning polyester chips. The term "chemically regenerated regular polyester chips" in the present description refers to polyester chips prepared by direct repolymerization and not having any functional additive added into the oligomer mixture during the chemical reproduction process. In the present embodiment, a main component forming the chemically regenerated regular polyester chips is regenerated polyethylene terephthalate. The term "chemically regenerated electrostatic pinning polyester chips" in the present description refers to those prepared by having electrostatic pinning additives added into the oligomer mixture and then repolymerized. In the present embodiment, the chemically regenerated electrostatic pinning polyester chips include regenerated polyethylene terephthalate as a main component and the electrostatic pinning additives.

It should be noted that, in the present description, the term "electrostatic pinning" refers to use of materials that increase electrical conductivity or decrease electrical resistance, and the term "electrostatic pinning additives" refers to materials that increase electrical conductivity or decrease electrical resistance.

The electrostatic pinning additives are metal salts. The metal salts can be sodium hydroxide, potassium hydroxide, or metal salts containing aliphatic carboxylic acid. In the metal salts containing aliphatic carboxylic acid, a carbon number of the aliphatic carboxylic acid ranges from 2 to 30. For example, the aliphatic carboxylic acid (in the form of metal salts) contains monocarboxylic acid and dicarboxylic acid, and can be, for example, acetic acid, palmitic acid, stearic acid, oleic acid, or sebacic acid. In the present embodiment, the aliphatic carboxylic acid is preferably the acetic acid. To be more specific, a metal component of the metal salts can be, for example, alkali metal or alkaline-earth metal. In other words, the metal salts can be, for example, lithium salts, sodium salts, potassium salts, manganese salts, zinc salts, calcium salts, magnesium salts, or aluminum salts. In the present embodiment, the metal salts are preferably the magnesium salts or the lithium salts. The magnesium salts can be, for example, magnesium acetate (Mg($CH_3COO$)$_2$), and the lithium salts can be, for example, lithium acetate ($CH_3COOLi$). However, the present disclosure is not limited thereto.

Moreover, in the chemical reproduction process, the functional additives mentioned above (such as the slipping agent, the coloring agent and the matting agent) can also be added into the oligomer mixture. Accordingly, after repolymerizing the oligomer mixture, chemically regenerated slipping polyester chips, chemically regenerated color polyester chips or chemically regenerated matting polyester chips can be prepared sequentially. It should be noted that, the chemically regenerated slipping polyester chips, the chemically regenerated color polyester chips, and the chemically regenerated matting polyester chips each include regenerated polyethylene terephthalate as a main component.

In step S4, the modified polyester chips are produced from the recycled polyester material by way of chemical reproduction. That is to say, the modified polyester chips are chemically regenerated modified polyester chips.

The chemically regenerated modified polyester chips are prepared by the following steps. The recycled polyester material is depolymerized to obtain a first oligomer mixture. At least one of 1,4-butanediol, isophthalic acid, neopentyl glycol, 2-methyl-1,3-propanediol, pentanediol, isopentyldiol, adipic acid, and 1,4-cyclohexanedimethanol is added into the first oligomer mixture to form a second oligomer mixture. The second oligomer mixture is repolymerized to obtain the chemically regenerated modified polyester chips.

The chemically regenerated modified polyester chips include regenerated polyethylene terephthalate as a main component, and include residue of at least one of 1,4-butanediol, isophthalic acid, neopentyl glycol, 2-methyl-1,3-propanediol, pentanediol, isopentyldiol, adipic acid, and 1,4-cyclohexanedimethanol. Based on a total weight of the chemically regenerated modified polyester chips being 100 wt %, the chemically regenerated modified polyester chips include at least one of the following: 0 to 60 wt % of 1,4-butanediol residue; 0 to 20 wt % of isophthalic acid residue; 0 to 20 wt % of neopentyl glycol residue; 0 to 60 wt % of 2-methyl-1,3-propanediol residue; 0 to 20 wt % of pentanediol residue; 0 to 20 wt % of isopentyldiol residue; 0 to 20 wt % of adipic acid residue; and 0 to 20 wt % of 1,4-cyclohexanedimethanol residue.

In the present description, the term "residue" refers to a group or a unit derived from a specific compound in a chemical reaction. For example, "a residue of a dibasic acid component" is a group derived from the dibasic acid component after an esterification reaction or a polycondensation reaction in a polyester or a copolyester, and "a residue of a diol component" is a group derived from the diol component after an esterification reaction or a polycondensation reaction in a polyester or a copolyester.

In step S5, the physically regenerated polyester chips prepared in step S1 and the chemically regenerated polyester chips prepared in step S2 are mixed with each other to form the base material. The base material is used for forming the base layer 11. In this way, a usage ratio of recycled polyester in the polyester film for laser embossing 1 of the present disclosure is high. In other embodiments, the base layer 11 can be of other polyester materials that are commercially available.

In step S6, the raw material mixture in step S4 and the base material in step S5 are co-extruded to form one polyester film for laser embossing that includes the base layer 11 formed from the base material and the skin layer 12 formed from the raw material mixture. In other embodiments, the method for manufacturing the polyester film for laser embossing is not limited to co-extruding. The base layer 11 and the skin layer 12 can also be respectively formed, and then the skin layer 12 is disposed on the base layer 11.

Second Embodiment

Figure 3:
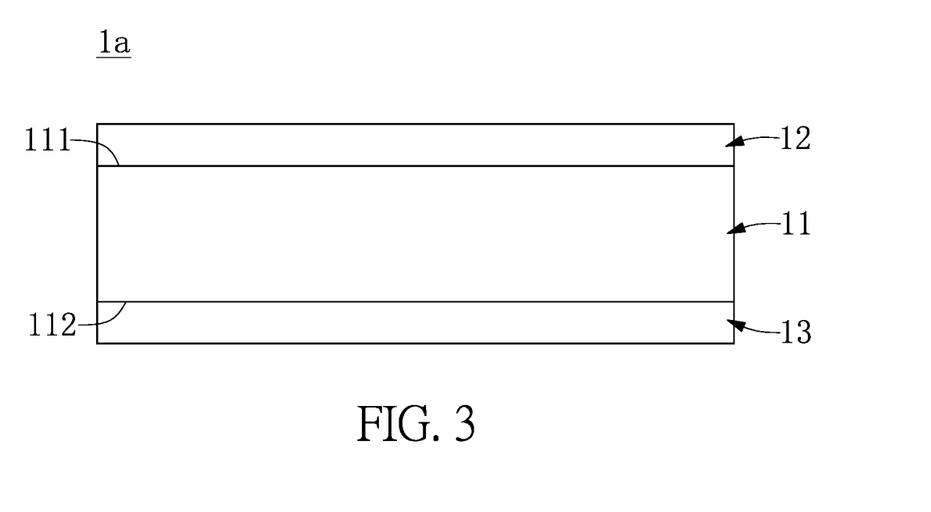
FIG. 3 is a side schematic view of a polyester film for laser embossing according to a second embodiment of the present disclosure.

Referring to FIG. 3, a second embodiment of the present disclosure provides a polyester film for laser embossing 1. The polyester film for laser embossing 1 includes a base layer 11, a skin layer 12, and another skin layer 13. The base layer 11 has a first surface 111 and a second surface 112 that are opposite to each other. The skin layer 12 is disposed on the first surface 111 of the base layer 11, and the another skin layer 13 is disposed on the second surface 112 of the base layer 11. The skin layers 12, 13 are each an easy-to-press embossed pattern layer. During use, a three-dimensional embossed pattern (not shown in the figure) can be formed onto each of the skin layers 12, 13. The three-dimensional embossed pattern formed onto the skin layer 12 can be the same or different from the three-dimensional embossed pattern formed onto the another skin layer 13.

The materials forming the base layer 11, the skin layer 12, and the another skin layer 13 of the second embodiment are similar to those forming the base layer 11 and the skin layer 12 of the first embodiment, and will not be reiterated herein.

Third Embodiment

Figure 4:
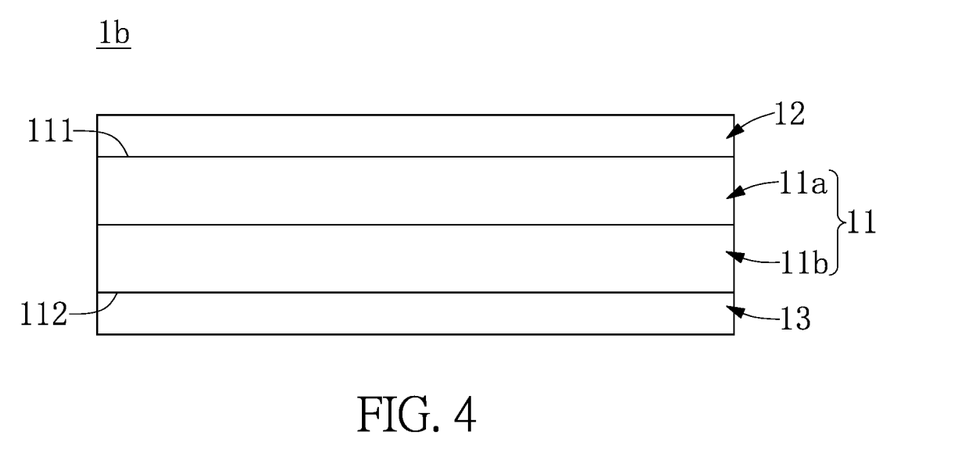
FIG. 4 is a side schematic view of a polyester film for laser embossing according to a third embodiment of the present disclosure.

Referring to FIG. 4, a third embodiment of the present disclosure provides a polyester film for laser embossing 1. The polyester film for laser embossing 1 of the third embodiment is similar to the polyester film for laser embossing 1 of the second embodiment. The difference lies in that a base layer 11 of the third embodiment includes a first base layer 11a and a second base layer 11b stacked upon each other, and compositions of the first base layer 11a and the second base layer 11b can be the same or different from each other. For example, the first base layer 11a and the second base layer 11b can be formed from different polyesters, or a functional additive contained in the first base layer 11a can be different from that contained in the second base layer 11b.

Beneficial Effects of the Embodiments

One of the beneficial effects of the present disclosure is that, in the polyester film for laser embossing and the method for manufacturing the same as provided, by virtue of "the first polyester composition including regenerated polyethylene terephthalate as a main component and at least one component selected from 1,4-butanediol, isophthalic acid, neopentyl glycol, 2-methyl-1,3-propanediol, pentanediol, isopentyldiol, adipic acid, and 1,4-cyclohexanedimethanol", an amount of the recycled polyester material in the polyester film for laser embossing 1 can be increased.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A polyester film for laser embossing, which is made from a recycled polyester material, the polyester film comprising:
   a single base layer including regenerated polyethylene terephthalate as a main component; and
   a skin layer disposed on at least one surface of the base layer, wherein the skin layer is used to form an embossed pattern, the skin layer is formed from a first polyester composition, and the first polyester composition includes regenerated polyethylene terephthalate as a main component and a modified agent being at least one component selected from neopentyl glycol, 2-methyl-1,3-propanediol, pentanediol, and isopentyldiol, so that a melting point of the skin layer ranges from 190° C. to 240° C.;
   wherein a thickness of the skin layer is 5% to 40% of a total thickness of the polyester film for laser embossing.

2. The polyester film according to claim 1, wherein the first polyester composition includes a physically regenerated polyester resin and a chemically regenerated polyester resin, a main component of each of the physically regenerated polyester resin and the chemically regenerated polyester resin is regenerated polyethylene terephthalate; wherein, based on a total weight of the first polyester composition being 100 wt %, a content of the physically regenerated polyester resin ranges from 50 wt % to 95 wt %, a content of the chemically regenerated polyester resin ranges from 1 wt % to 40 wt %, and a total content of the physically regenerated polyester resin and the chemically regenerated polyester resin ranges from 50 wt % to 100 wt %.

3. The polyester film according to claim 2, wherein the chemically regenerated polyester resin is formed from chemically regenerated polyester chips, and the chemically regenerated polyester chips include chemically regenerated regular polyester chips, chemically regenerated electrostatic pinning polyester chips, and chemically regenerated modified polyester chips; wherein the chemically regenerated modified polyester chips include regenerated polyethylene terephthalate as a main component, and include residue of at least one of neopentyl glycol, 2-methyl-1,3-propanediol, pentanediol, and isopentyldiol.

4. The polyester film according to claim 3, wherein, based on a total weight of the chemically regenerated modified polyester chips being 100 wt %, the chemically regenerated modified polyester chips include at least one of following residues:
   0 to 20 wt % of neopentyl glycol residue;
   0 to 60 wt % of 2-methyl-1,3-propanediol residue;
   0 to 20 wt % of pentanediol residue; and
   0 to 20 wt % of isopentyldiol residue.

5. The polyester film according to claim 2, wherein a concentration of cyclic oligomer in the physically regenerated polyester resin is lower than a concentration of cyclic oligomer in the chemically regenerated polyester resin.

6. The polyester film according to claim 1, wherein the skin layer contains 0.0003 wt % to 2 wt % of a nucleating agent.

7. The polyester film according to claim 1, wherein the total thickness of the polyester film for laser embossing ranges from 8 micrometers to 350 micrometers.

8. The polyester film according to claim 1, wherein, based on a total weight of the first polyester composition being 100 wt %, the first polyester composition contains 1 wt % to 25 wt % of a biomass-derived material, and a content of $C^{14}$ among total carbon atoms in the first polyester composition ranges from 0.2 wt % to 5 wt %.

9. The polyester film according to claim 1, wherein, based on a total weight of the first polyester composition being 100 wt %, the first polyester composition contains 0.0003 wt % to 0.04 wt % of a metal catalyst, and the metal catalyst is selected from the group consisting of antimony, germanium, titanium, or any combination thereof.

10. The polyester film according to claim 1, wherein the base layer is formed from a second polyester composition, the second polyester composition includes regenerated polyethylene terephthalate as a main component, the second polyester composition includes a physically regenerated polyester resin and a chemically regenerated polyester resin, and a main component of each of the physically regenerated polyester resin and the chemically regenerated polyester resin is regenerated polyethylene terephthalate, and wherein, based on a total weight of the second polyester composition being 100 wt %, a content of the physically regenerated polyester resin ranges from 50 wt % to 95 wt %, a content of the chemically regenerated polyester resin ranges from 1 wt % to 40 wt %, and a total content of the physically regenerated polyester resin and the chemically regenerated polyester resin ranges from 50 wt % to 100 wt %.

11. A method for manufacturing a polyester film for laser embossing, the method comprising:
   providing a recycled polyester material;
   physically reproducing a part of the recycled polyester material to obtain physically regenerated polyester chips, the physically regenerated polyester chips including physically regenerated regular polyester chips;
   chemically reproducing another part of the recycled polyester material to obtain chemically regenerated polyester chips, the chemically regenerated polyester chips including chemically regenerated regular polyester chips and chemically regenerated electrostatic pinning polyester chips;
   mixing modified polyester chips with the physically regenerated polyester chips and the chemically regenerated polyester chips to form a raw material mixture, wherein the modified polyester chips are formed through reproducing the recycled polyester material, and the modified polyester chips include regenerated polyethylene terephthalate as a main component and a modified agent being at least one component selected from neopentyl glycol, 2-methyl-1,3-propanediol, pentanediol, and isopentyldiol;
   forming a skin layer from the raw material mixture, a melting point of the skin layer ranging from 190° ° C. to 240° C., and the skin layer being used to form an embossed pattern; and
   forming a single base layer including regenerated polyethylene terephthalate as a main component on the skin layer to obtain the polyester film for laser embossing;
   wherein a thickness of the skin layer is 5% to 40% of a total thickness of the polyester film for laser embossing.

12. The method according to claim 11, wherein the modified polyester chips are chemically regenerated modified polyester chips, and the chemically regenerated modified polyester chips are prepared by steps of:
   depolymerizing the recycled polyester material to obtain a first oligomer mixture;
   adding at least one of: neopentyl glycol, 2-methyl-1,3-propanediol, pentanediol, and isopentyldiol into the first oligomer mixture to form a second oligomer mixture; and
   repolymerizing the second oligomer mixture to obtain the chemically regenerated modified polyester chips;
   wherein the chemically regenerated modified polyester chips include regenerated polyethylene terephthalate as a main component, and include residue of at least one of neopentyl glycol, 2-methyl-1,3-propanediol, pentanediol, and isopentyldiol.

13. A method for manufacturing a polyester film for laser embossing, the method comprising:
   providing a recycled polyester material;
   physically reproducing a part of the recycled polyester material to obtain physically regenerated polyester chips, the physically regenerated polyester chips including physically regenerated regular polyester chips;
   chemically reproducing another part of the recycled polyester material to obtain chemically regenerated polyester chips, the chemically regenerated polyester chips including chemically regenerated regular polyester chips and chemically regenerated electrostatic pinning polyester chips;
   mixing modified polyester chips with the physically regenerated polyester chips and the chemically regenerated polyester chips, so as to form a raw material mixture; wherein the modified polyester chips are formed through chemically reproducing the recycled polyester material, and the modified polyester chips include regenerated polyethylene terephthalate as a main component, and include residue of a modified agent being at least one of neopentyl glycol, 2-methyl-1,3-propanediol, pentanediol, and isopentyldiol;
   mixing the physically regenerated polyester chips and the chemically regenerated polyester chips to form a base material including regenerated polyethylene terephthalate as a main component; and
   co-extruding the raw material mixture and the base material to obtain the polyester film for laser embossing, wherein the polyester film for laser embossing includes a skin layer formed from the raw material mixture and a single base layer formed from the base material, the skin layer is used to form an embossed pattern, and a melting point of the skin layer ranges from 190° C. to 240° C.;
   wherein a thickness of the skin layer is 5% to 40% of a total thickness of the polyester film for laser embossing.

14. The polyester film according to claim 1, wherein the polyester film includes only one layer of the skin layer.

15. The polyester film according to claim 1, wherein the polyester film includes two layers of the skin layers, and the base layer is disposed between the two layers of the skin layers.

16. The polyester film according to claim 14, wherein the total thickness of the polyester film for laser embossing ranges from 8 micrometers to 350 micrometers.

17. The polyester film according to claim 15, wherein the total thickness of the polyester film for laser embossing ranges from 8 micrometers to 350 micrometers.

\* \* \* \* \*